(12) United States Patent
Zhu

(10) Patent No.: US 10,503,060 B1
(45) Date of Patent: Dec. 10, 2019

(54) DYNAMIC PROJECTION LIGHT

(71) Applicant: Yanling Zhu, Fuyang (CN)

(72) Inventor: Yanling Zhu, Fuyang (CN)

(*) Notice: Subject to any disclaimer, the term of this patent is extended or adjusted under 35 U.S.C. 154(b) by 0 days.

(21) Appl. No.: 16/147,588

(22) Filed: Sep. 29, 2018

(30) Foreign Application Priority Data

Jul. 31, 2018 (CN) .................... 2018 2 1220308 U

(51) Int. Cl.
*G03B 21/43* (2006.01)
*G03B 21/20* (2006.01)
*G03B 21/14* (2006.01)
*G03B 21/32* (2006.01)

(52) U.S. Cl.
CPC ............ *G03B 21/43* (2013.01); *G03B 21/145* (2013.01); *G03B 21/2033* (2013.01); *G03B 21/321* (2013.01)

(58) Field of Classification Search
CPC .. G03B 21/43; G03B 21/2033; G03B 21/145; G02B 21/321
See application file for complete search history.

(56) References Cited

U.S. PATENT DOCUMENTS

| | | | | |
|---|---|---|---|---|
| 1,929,360 | A * | 10/1933 | Knox | G03B 1/10 352/224 |
| 1,959,268 | A * | 5/1934 | Goldhammer | G03B 21/43 352/172 |
| 5,146,247 | A * | 9/1992 | Kashiwagi | G03B 21/113 353/25 |
| 10,041,651 | B1 | 8/2018 | Xi | |
| 2002/0171808 | A1 * | 11/2002 | Quiroz | G03B 1/42 352/221 |
| 2012/0092623 | A1 | 4/2012 | Huebner | |
| 2017/0082254 | A1 | 3/2017 | Zhang | |
| 2017/0329211 | A1 | 11/2017 | Chien | |

* cited by examiner

*Primary Examiner* — Cara E Rakowski
*Assistant Examiner* — Danell L Owens
(74) *Attorney, Agent, or Firm* — Hemisphere Law, PLLC; Zhigang Ma

(57) ABSTRACT

A dynamic projection light includes an end to end long strip of film, a film guiding box, a first lens support and a second lens support which are arranged on both sides of the film guiding box, and a driving device provided with one or more touch parts. The film guiding box defines a guiding crack through which the film is capable of passing and being guided, one or more through holes and one or more insertion holes communicating with the guiding crack. The one or more touch parts are capable of extending into the one or more insertion holes to contact with the film so that the driving device can drive the film to move in the film guiding box, enabling patterns on the film to be projected in sequence.

9 Claims, 5 Drawing Sheets

DYNAMIC PROJECTION LIGHT

BACKGROUND OF THE INVENTION

1. Field of the Invention

The present invention relates to projection lights, in particular to a dynamic projection light.

2. Description of Related Art

Existing projection lights generally include an LED light source, a convex lens arranged in front of the light source, a film arranged in front of the lens, and a lens arranged in front of the film. The light emitted by the LED light source is diffused by the convex lens, then passes through the film and the lens successively, and finally can reach a preset point, as a result, patterns on the film can be projected onto the point, so that preset patterns can be formed on a projection surface outside the projection light. The patterns projected in this way are static patterns. If movement is required, a group of focus lenses, a motor and a matching rotating mechanism are adopted, the rotating mechanism rotates to drive a mount loaded with a plurality of films to rotate, so that the films rotate accordingly. The projection light of this structure is large in size, and miniaturization is hard to realize. Besides, the projected patterns are limited by the number of the films on the mount, thus resulting in poor variability of patterns and interestingness.

BRIEF DESCRIPTION OF THE SEVERAL VIEWS OF THE DRAWING(S)

DETAILED DESCRIPTION OF THE INVENTION

Figure 1:
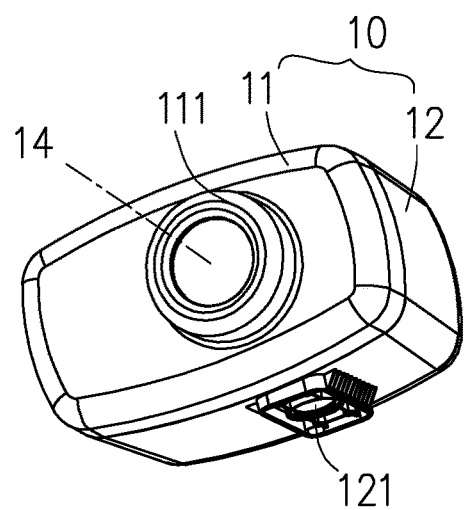
FIG. 1 is a perspective view of a dynamic projection light in accordance with a first embodiment of the present invention.
Figure 2:
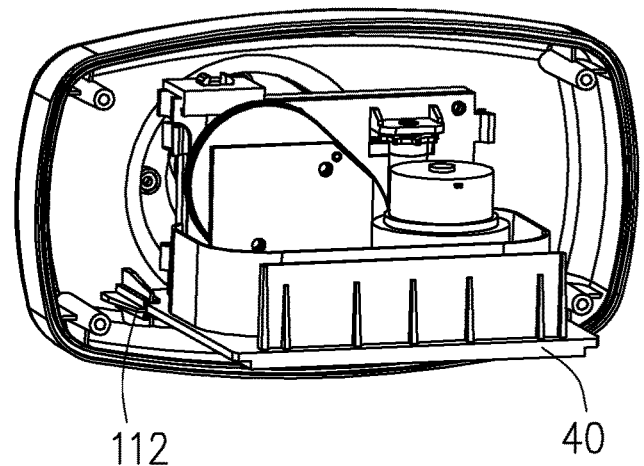
FIG. 2 is a perspective view of a dynamic projection light with a back cover removed in accordance with a first embodiment of the present invention.
Figure 3:
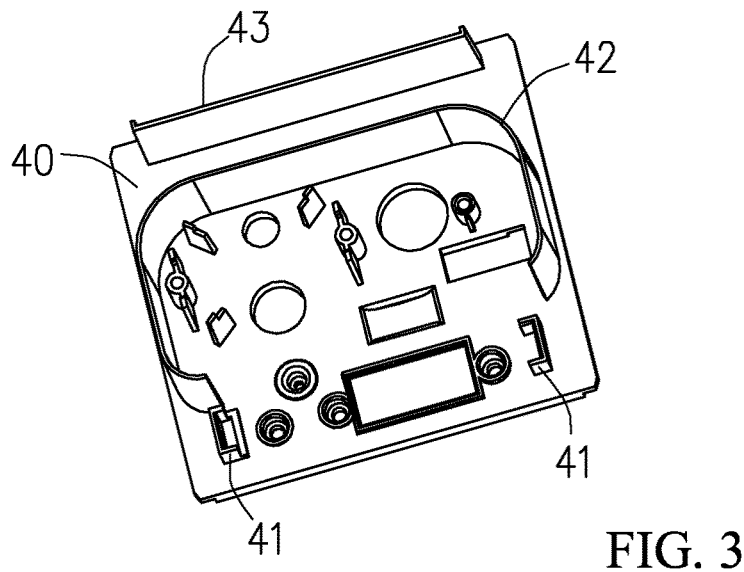
FIG. 3 is a perspective view of a middle plate of the dynamic projection light in FIG. 2.
Figure 4:
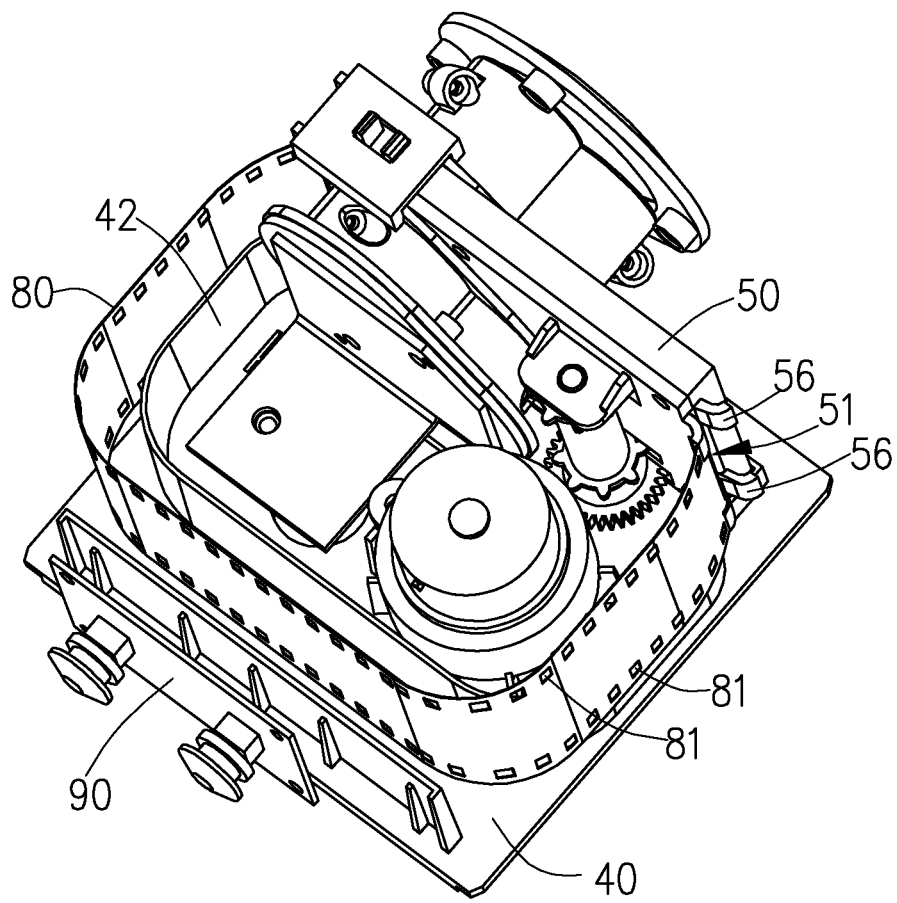
FIG. 4 is a perspective view of the dynamic projection light in FIG. 2 with a housing removed.

The dynamic projection light of the present invention will be described in further detail with reference to specific embodiments and drawings.

First Embodiment

As shown in FIGS. 1-8, the dynamic projection light in accordance with the first embodiment of the present invention mainly includes a housing 10, a first lens support 20 and a second lens support 30 arranged in the housing 10 for fixing lenses, a middle plate 40, a film guiding box 50, a light panel 60 provided with two light sources 62, a driving device 70, a film 80, and a control circuit board 90 for controlling the light sources 62 on the light panel 60 and the driving device 70.

Hereinafter, for convenience of description, an optical central axis (simply referred to as a central axis) 14 of the dynamic projection light is defined, thus, when all the lenses in the first and second lens supports 20, 30 are arranged in a line and share the same optical axis, the shared optical axis is the central axis 14. When all the lenses are seperated into two or two more groups, and the two or two more groups of lenses are arranged in two or two more corresponding lines and share corresponding optical axises, respectively, the central axis 14 is in a central position among all the optical axises. That is, lights from the light sources 62 pass through the lens fixed in the first lens support 20, the film 80, and the lens fixed in the second lens support 30 and then are emitted toward a front side of the central axis.

The housing 10 includes a front cover (a cover located in the front side of the central axis) 11 and a rear cover 12 (a cover located in a back side of the central axis) connected to the from cover 11 to define an accommodation space. A hollow circular tube 111 with an open end projects from the front cover 11 toward the front side of the central axis, and is used for receiving at least a part of the second lens support 30. An opening defined in the open end of the circular tube 111 serves as a light outlet of the dynamic projection light. Two support bodies 112 extend substantially (i.e., virtually or nearly) perpendicularly from an inner surface of the front cover 11, and slots allowing the middle plate 40 to be inserted therein are formed at opposite sides of the two support bodies 112.

The middle plate 40 is inserted into the slots of the support bodies 112, thus is detachably connected to the inner side of the front cover 11 via the support bodies 112, and a top surface of the middle plate 40 is substantially parallel to the direction of the central axis.

A side, near the front cover 11, of the middle plate 40 is provided with two components 41 which are substantially C-shaped (viewed from the direction perpendicular to the top surface of the middle plate), and the openings of the two components 41 are opposite, thereby forming a slot/mount for fixing the film guiding box 50. A wall 42 which is substantially C-shaped (viewed from the direction perpendicular to the top surface of the middle plate) extends substantially perpendicularly from the middle plate 40. Two ends of the wall 42 are close to the two components 41 respectively, and an opening defined by the two ends of the wall 42 faces the film guiding box 50.

The film 80 is a long strip in a roll-shaped, and in this embodiment, the film is specifically an end to end long strip of film, or an annular film. A part of the film 80 is clamped/inserted in the film guiding box 50, and the other part of the film 80 is sleeved the wall 42. That is, in operation, the film 80 is guided through the film guiding box 50 and the wall 42 during movement. Two rows of guiding perforations 81 are formed near two side edges of the film 80. The film 81 may be a negative film or cine film with holes in both sides for a camera, or a substrate made of PET (polyethylene terephthalate) and multiple color printed layers printed on the substrate by the silk-screen printing technology, different layers have different colors and different printed patterns, and color patterns such as snowflakes, auroras, color castles or flowers and leaves are formed after lamination of multiple layers. The ink for the printed layers is preferably anti-ultraviolet ink. In addition, the thickness of the substrate is 0.8-1.5 mm, and the thickness of all the printed layers is 0.05-0.1 mm. Continuous patterns may be formed on the film 81, or patterns may be formed at intervals. In this embodiment, continuous patterns are formed. Since the film 81 is roll-shaped, the overall length of the film 81 can be made very long, so that more patterns can be printed.

The film guiding box 50 is used for guiding a moving direction of the film, it is inserted into the inner sides of the two substantially C-shaped components 41, and is substantially perpendicular to the middle plate 40. A guiding crack 51 used for permitting the film 80 to pass through and guiding the film 80 when moving is defined in the film guiding box 50. One or two through holes 52 communicating with the guiding crack 51 and plural of insertion holes 53 corresponding to the two rows of guiding perforations 81 of the film 80 are also defined in the film guiding box 50. Specifically, referring to FIG. 5, the film guiding box 50 includes a first cover 54 and a second cover 55 which are oppositely arranged and fixed and are generally plate-shaped. Flanges 57 project from two edges, on both sides of the guiding crack 52, of the first cover 54 and the second cover 55, and the flanges 57 are in contact after the first cover 54 and the second cover 55 are connected, so that a gap is formed between the flanges 57 to serve as the guiding crack 51. The insertion holes 53 and the through holes 52 are via holes penetrating through the first cover 54 and the second cover 55. Protruding ribs 56 are formed on the opposite surfaces of the first cover 54 and the second cover 55 at positions opposite to the guiding perforations 81 (i.e., opposite to the two side edges of the film), and the two ends of each rib 56 extend out from the two side ends of the first cover 54 and the second cover 55 in an outwardly expanding (bending toward the outside of the first cover 54 and the second cover 55 respectively) arc shape, so that the ends extending from the first cover and the second cover form a splayed shape together to smoothly guide the film 80 in and out. After the first cover 54 and the second cover 55 are connected, the opposite ribs 56 do not make contact with each other, that is, the ribs 56 are located in the guiding crack 51 and have a height lower than that of the flanges 57 relative to the surface of the first cover 54 and the second cover 55. In this embodiment, in order to facilitate the connection between the first cover 54 and the second cover 55, two buckle pieces 58 project from the second cover 55. A substantially C-shaped fixing member 581 clamps the first cover 54 and the second cover 55, and is provided with a hole into which the buckle pieces 58 are inserted and stuck. In addition, a fixing piece 59 extends substantially perpendicularly from the surface, away from the second cover 55, of the first cover 54, and the fixing piece 59 is located on the periphery of the insertion holes 53 and is parallel to the direction in which the film 80 moves in the film guiding box 50.

Figure 5:
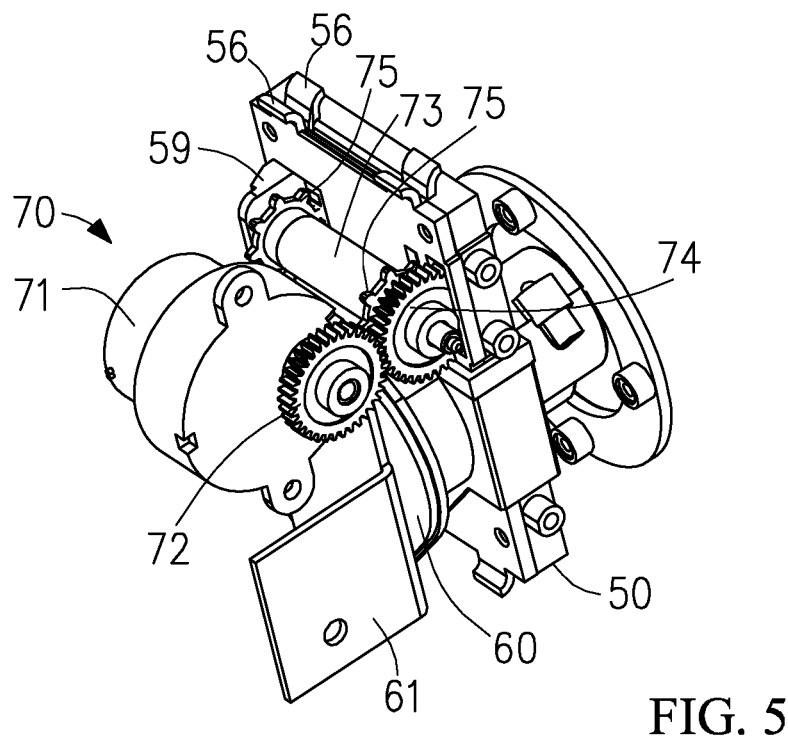
FIG. 5 is a perspective view of main components of the dynamic projection light in the first embodiment of the present invention.

Please also refer to FIG. 5, the driving device 70 mainly includes a motor 71 fixed to the middle plate 40 and located on an inner side of the wall 42, a second gear 72 used for deceleration sleeved on an output shaft of the motor 71, a rotating shaft 73, a third gear 74 sleeved on the rotating shaft 73 and meshed with the second gear 72, and two first gears 75 sleeved on the rotating shaft 73. The two first gears 75 are opposite to the insertion holes 53 in the film guiding box 50. The gear teeth of the first gears 75 match the guiding perforations 81 in the film 80, extend into the insertion holes 53 and can be inserted into the guiding perforations 81. One end of the rotating shaft 73 is rotatably connected with the fixing piece 59, and the other end of the rotating shaft 73 is rotatably connected with the middle plate 40. When the motor 71 start work, the output shaft rotates and drives the second gear 72 to rotate, thereby driving the third gear 74 to rotate, and the rotating shaft 73 rotates accordingly, driving the two first gears 75 to rotate synchronously. The rotation of the first gears 75 drives the film 80 to move so that the patterns on the film are projected in sequence. In this embodiment, the gear teeth on the first gears 75 are uniformly arranged, so as to drive the film to move at a constant speed, and an uninterrupted pattern scene effect can be created. In other embodiments, different reduction gear combinations may be used instead of the second gear 72 to accomplish speed reduction and transmission.

Figure 6:
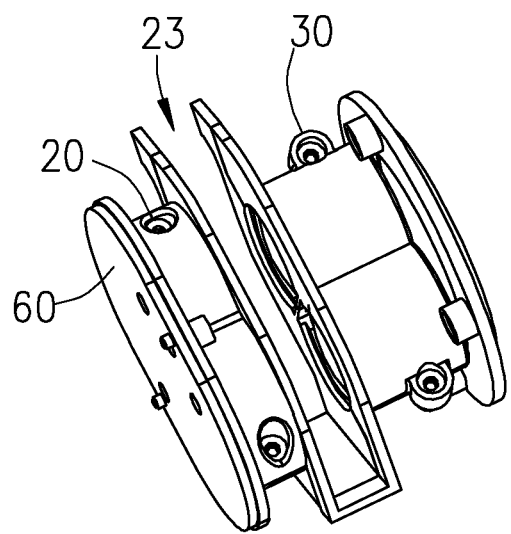
FIG. 6 is a perspective view of a first lens support and a second lens support of the dynamic projection light in accordance with the first embodiment of the present invention.
Figure 7:
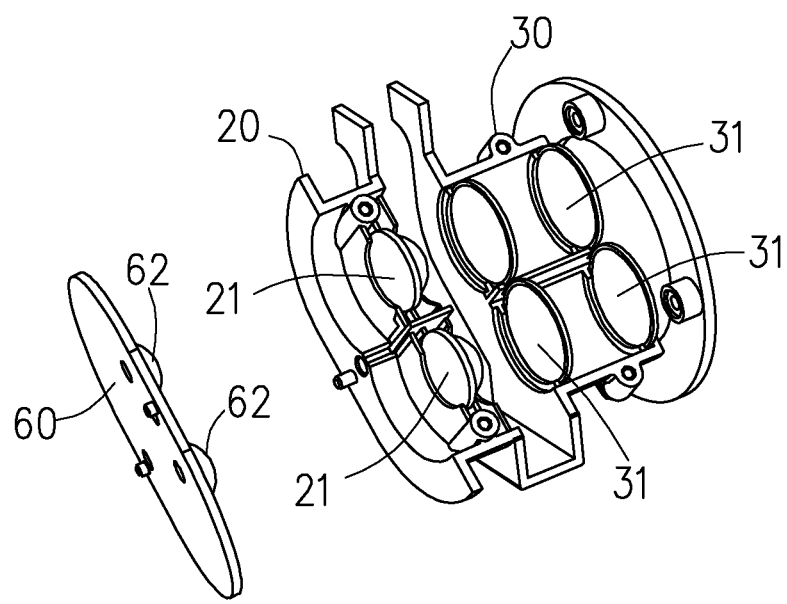
FIG. 7 is a perspective view of the first lens support and the second lens support in FIG. 6 with half removed.
Figure 8:
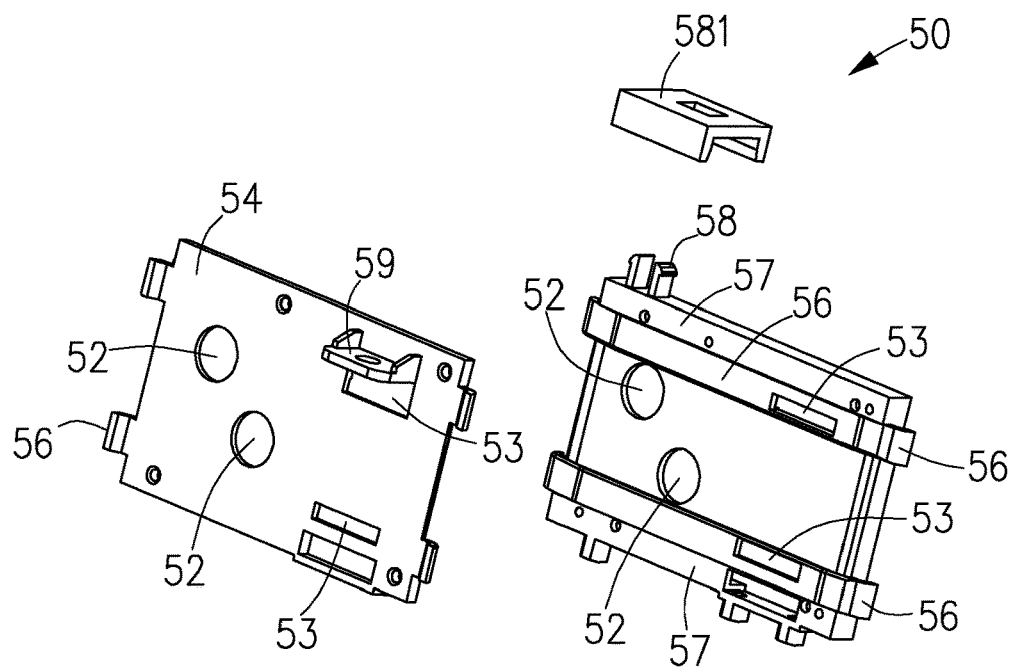
FIG. 8 is an exploded view of a film guiding box of the dynamic projection light in accordance with the first embodiment of the present invention.

Please also refer to FIG. 6 and FIG. 7, the first lens support 20 is used to fix at least one convex lens 21, and in this embodiment, to fix two convex lenses 21 arranged side by side. Focusing lenses 31 are fixed in the second lens support 30, and in this embodiment, there are two rows of focusing lenses 31, and each row has two focusing lenses 31 lining up alongside the convex lenses 21 in the first lens support 20. The first lens support 20 and the second lens support 30 are both in a hollow columnlike shape. In this embodiment, the first lens support 20 and the second lens support 30 are connected at a position close to the periphery, thereby forming a groove 23 between the first lens support 20 and the second lens support 30. The film guiding box 50 can be inserted into the groove. When the film guiding box 50 is inserted into the groove 23, the through holes 52 are opposite to the convex lenses 21 and the focusing lenses 31, so that a part of the film 80 is disposed between the convex lenses 21 and the focusing lenses 31. The second lens support 30 is at least partially received in the circular tube 111, and the first lens support 20 is located on the inner side of the wall 42. In addition, in order to facilitate the assembly and replacement of the lenses 21 and 31, the first lens support 20 and the second lens support 30 may be divided into two parts along a plane parallel to the central axis of the lenses, the two parts may be connected by screws. As shown in FIG. 7, a part of each lens support is not shown.

The light panel 60 provided with the two light sources 62 is fixed to the side, away from the film guiding box 50, of the first lens support 20, and the light sources 62 opposite to the two lenses 21 fixed in the first lens support 20 respectively are arranged on the light panel 60. In this embodiment, an L-shaped fixing piece 61 is also fixed to the light panel 60. By fixing the L-shaped fixing piece 61 to the middle plate 40, the positions of the first lens support 20 and the second lens support 30 can be fixed. At this time, at least a part of the second lens support 30 extends into the circular tube 111 on the front cover 11, and the first lens support 20 and the light panel 60 and the L-shaped fixing piece 61 are located on the inner side of the wall 42. In particular, the L-shaped fixing piece 61 may be made of heat-conducting metal, a through hole 121 may be formed in the middle plate 40, and an external heat sink may extend into the through hole 121 and make contact with the L-shaped fixing piece 61, so that the heat transmitted from the light sources 62 to the light panel 60 and then to the L-shaped fixing piece 61 can be guided out of the dynamic projection light in time to ensure the normal operation of the light sources. The L-shaped fixing piece 61 may be made of aluminum alloy or stainless steel or other metal or alloy materials with good thermal conductivity.

The control circuit board 90 for controlling the light sources 62 on the light panel 60 and the driving device 70 is fixed on a fixing plate 43 extending from the middle plate 40, and the fixing plate 43 is located on an outer side of the wall 42, so as to be away from the light sources emitting a large amount of heat to further ensure stable operation.

In this embodiment, two projection units are arranged, each projection unit includes one light source 62, one convex lens 21, and two condenser lenses 31. In operation, the control circuit board 90 can control the two projection units by controlling the light emission modes of the light sources 62 in the two projection units respectively, thereby realizing varied projection effects. For example, two groups of patterns showing broken-down movements are alternately printed on the film, two groups of projection light sources are alternately lit during projection, and the animation effect of moving objects can be achieved by using the visual persistence technology. Since the film is roll-shaped and extends around the outer side of the wall 42, and the wall 42 is located near the periphery of the middle plate 40, the film is long, more images can be projected, with an improved interestingness of the projection light, and the market demand can be met more easily.

In other embodiments, one row of guiding perforations may be formed in the film to replace the two-row of guiding perforations in the first embodiment.

In this embodiment, the guiding perforations are formed in the film. In other embodiments, the guiding perforations can be omitted and the first gears can be replaced by two oppositely arranged rotating wheels which are in contact. One side edge or two side edges of the film are clamped between the oppositely arranged rotating wheels which are in contact. When the driving device works, the two rotating wheels rotate to drive the film clamped by the rotating wheels to move, so as to realize dynamic projection.

In this embodiment, one end of the rotating shaft is rotatably connected with the fixing piece on the film guiding box, and the other end of the rotating shaft is connected with the middle plate. In other embodiments, the film guiding box may be provided with two fixing pieces, and the other end of the rotating shaft is also rotatably connected with the other fixing piece.

In this embodiment, the substantially C-shaped fixing member 581 is used to clamp the first cover 54 and the second cover 55, and the buckle pieces 58 are used for clamp the fixing member 581. In other embodiments, the fixing member 581 and the buckle piece 58 may be omitted, and the first cover 54 and the second cover 55 may be directly fastened with screws.

In other embodiments, a point light source or a bulb other than an LED light may be adopted as a light source module. The lens support for the focusing lenses can also be omitted, and the focusing lenses can be directly fixed in the housing. The shape and structure of the housing are not limited to the above embodiment either.

Second Embodiment

Figure 9:
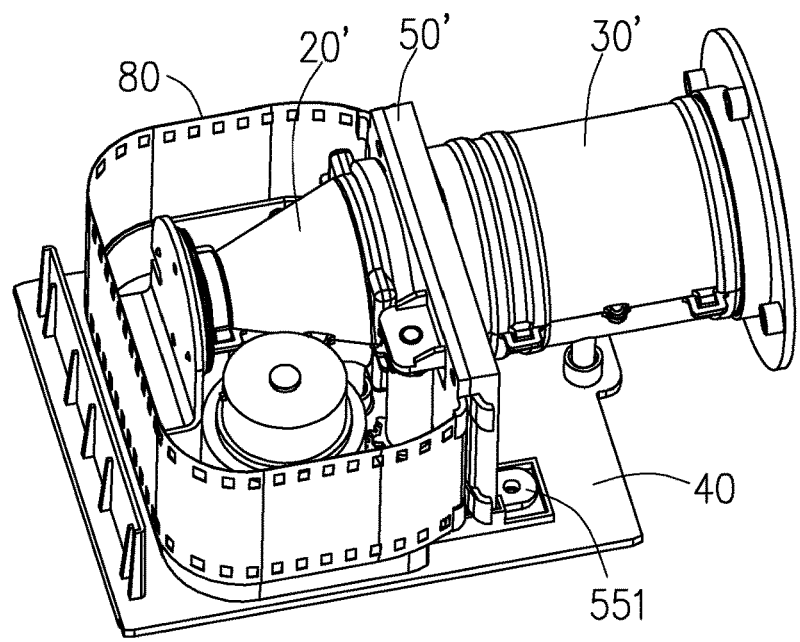
FIG. 9 is a perspective view of a dynamic projection light with a housing removed in accordance with a second embodiment of the present invention.
Figure 10:
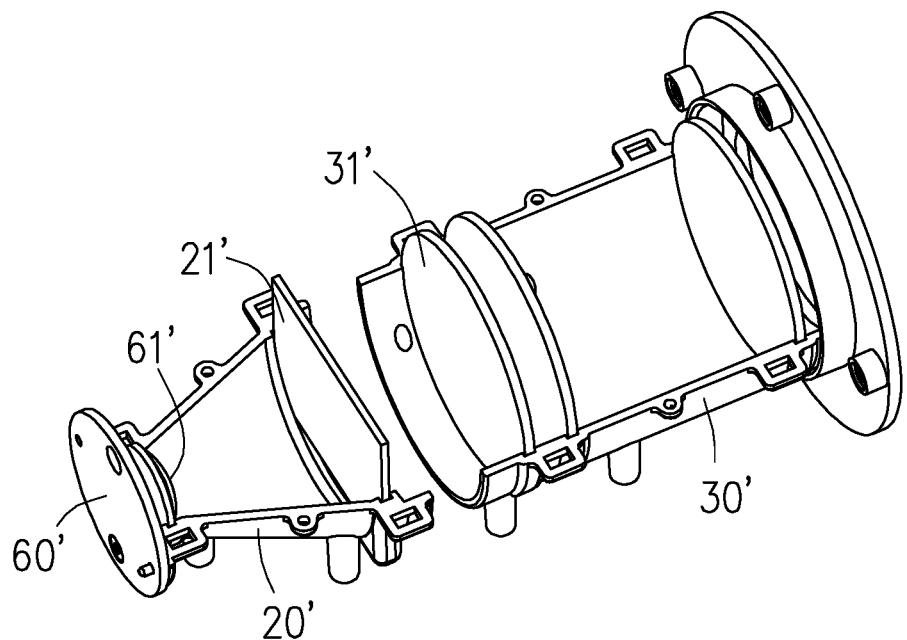
FIG. 10 is a perspective view of a first lens support and a second lens support, with half removed, of the dynamic projection light in the second embodiment.
Figure 11:
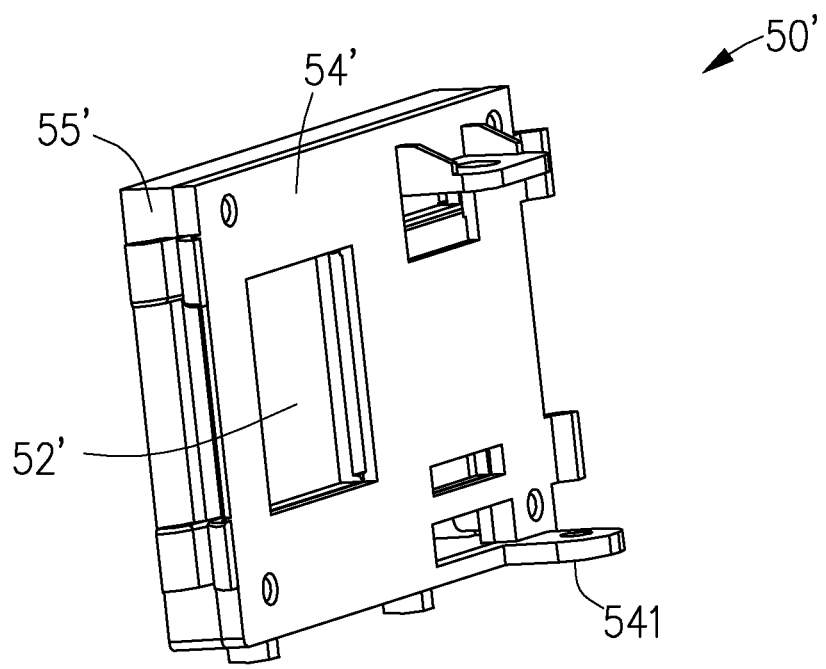
FIG. 11 is a perspective view of a film guiding box of the dynamic projection light in the second embodiment.

FIGS. 9-11 show a dynamic projection light in accordance with the second embodiment of the present invention. The dynamic projection light has a structure and function similar to those of the first embodiment, and mainly includes a housing 10, a first lens support 20' and a second lens support 30' arranged in the housing 10 for fixing lenses, a middle plate 40, a film guiding box 50', a light panel 60 provided with a light source 61', a driving device 70, a film 80, and a control circuit board 90 for controlling the light source 61' on the light panel 60 and the driving device 70. The main difference between the second embodiment and the first embodiment is that only one projection unit is arranged in the first lens support 20' and the second lens support 30'. That is, only one optical lens 21' is arranged in the first lens support 20', and one or more optical lenses 31' are arranged (line up, not side by side) in the second lens support 30'. The first lens support 20' and the second lens support 30' are independently arranged and are not fixedly connected, but are fixed on the middle plate 40 separately. Correspondingly, the film guiding box 50' is provided with only one through hole 52', and the light panel 60' may be provided with only one light source 61'. In addition, the film guiding box 50' is not provided with a fixing member or buckle pieces, fixing pieces 541 and 551 extend from the edges, near the middle plate 40, of the first cover 54' and the second cover 55', and the first cover 54' and the second cover 55' can be fixed to the middle plate by the fixing pieces 541 and 551.

Compared with the first embodiment, the second embodiment has only one optical path to project the image on the moving film 80.

According to the dynamic projection light of the present invention, the driving device is used to drive the roll-shaped film to rotate, the film is the only rotating part, thus the rotating part has a simple structure, a complicated film support is not needed, so the volume is small, but the film can be very long so that more images can be projected, and the film is assembled in a roll, so that the film can be played repeatedly, with an improved interestingness achieved.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A dynamic projection light, comprising:
   an end to end long strip of film;
   a film guiding box configured for guiding a moving direction of the film, defining a guiding crack through which the film is capable of passing and being guided, one or more through holes and one or more insertion holes communicating with the guiding crack;
   a first lens support and a second lens support configured on two sides of the film guiding box and configured for holding lenses arranged in an optical axis or in one more optical axises, the lenses facing a part of the film through the one or more through holes;
   a light panel provided with at least one light source, the light panel being fixed on a side, away from the film guiding box, of the first lens support, and the at least one light source being configured in or near the optical axis(s);
   a driving device comprising one or more touch parts capable of extending into the one or more insertion holes to contact with the film so that the driving device drives the film to move in the film guiding box, enabling patterns on the film to be projected in sequence; and a control circuit board for controlling the at least one light source and the driving device;

wherein the film guiding box comprises a substantially plate-shaped first cover and a substantially plate-shaped second cover connected to the first cover, a gap is defined between the first cover and the second cover and forms the guiding crack, and the one or more insertion holes and the one or more through holes are through holes penetrating through the first cover and the second cover;

wherein a fixing piece extends substantially perpendicularly from a surface, away from the second cover, of the first cover, and the fixing piece is located on the periphery of one of the one or more insertion holes;

wherein the driving device further comprises a motor, a second gear connected with an output shaft of the motor, a rotating shaft, and a third gear sleeved on the rotating shaft and meshed with the second gear; the one or more first gears are sleeved on the rotating shaft; one end of the rotating shaft is rotatably connected with the fixing piece, the other end of the rotating shaft is rotatably connected with a middle plate.

2. The dynamic projection light according to claim 1, wherein at least one row of guiding perforations are formed in the film, the positions of the guiding perforations are corresponding to the one or more insertion holes, the driving device comprises one ore more first gears to act as the one or more touch parts, the one or more first gears extend into the insertion holes, the gear teeth of the first gears are capable of being inserted into corresponding guiding perforations of the film, and when the driving device works, the one or more first gears rotate to drive the film to move, enabling the patterns on the film to be projected in sequence.

3. The dynamic projection light according to claim 1, wherein ribs are formed on opposite sides of the first cover and the second cover at positions corresponding to the two side edges of the film, and two ends of each rib extend out from the first cover and the second cover in an outwardly expanding arc shape, so as to smoothly guide the film in and out.

4. The dynamic projection light according to claim 1, wherein a convex lens is fixed in the first lens support, and at least two focusing lenses are fixed in the second lens support.

5. The dynamic projection light according to claim 4, wherein the first lens support and the second lens support are connected at a position close to peripheries of the first and second lens supports, thereby forming a groove between the first lens support and the second lens support into which the film guiding box is inserted.

6. The dynamic projection light according to claim 5, wherein two convex lenses arranged side by side are fixed in the first lens support, two groups of focusing lenses arranged side by side are fixed in the second lens support, and two light sources corresponding to the two convex lenses are fixed on the light panel.

7. The dynamic projection light according to claim 1, wherein the middle plate is at least used for fixing the film guiding box and the driving device, and the middle plate comprises a guiding wall along a moving track of the film.

8. The dynamic projection light according to claim 7, wherein a side, near the front cover, of the middle plate is provided with two components which are substantially C-shaped (viewed from a direction perpendicular to a top surface of the middle plate), and openings of the two components are opposite, thereby forming a slot for fixing the film guiding box.

9. The dynamic projection light according to claim 8, wherein when viewed from the direction perpendicular to the top surface of the middle plate, the guiding wall is substantially C-shaped and extends substantially perpendicularly from the middle plate, two ends of the wall are close to the two components respectively, and an opening defined by the two ends of the wall faces the film guiding box.

* * * * *